US005888076A

United States Patent [19]

Itoh et al.

[11] Patent Number: 5,888,076

[45] Date of Patent: Mar. 30, 1999

[54] LCD PANEL CONNECTOR FOR USE IN CONNECTION BETWEEN AN LCD PANEL AND A CIRCUIT BOARD

[75] Inventors: Shigenori Itoh, Hachioji; Kazuaki Ibaraki, Higashimurayama; Yoshiaki Ishiyama, Ebina; Hiroki Abe, Akishima, all of Japan

[73] Assignee: Japan Aviation Elecronics Industry, Limited, Japan

[21] Appl. No.: 938,070

[22] Filed: Sep. 26, 1997

[30] Foreign Application Priority Data

Jun. 13, 1997 [JP] Japan .................................... 9-156446

[51] Int. Cl.[6] ........................................ H01R 9/09

[52] U.S. Cl. ........................................ 439/74

[58] Field of Search ............................... 439/67, 71, 326, 439/74, 65; 349/149, 150, 152

[56] References Cited

U.S. PATENT DOCUMENTS 4,938,701 7/1990 Heberling .................................. 439/74

5,719,752 2/1998 Mori et al. .............................. 361/807

*Primary Examiner*—Neil Abrams
*Assistant Examiner*—Barry M. L. Standig
*Attorney, Agent, or Firm*—Laff, Whitesel, Conte & Saret, Ltd.

[57] ABSTRACT

An LCD panel (45) has a plurality of terminal electrodes (45*d*) formed at a peripheral portion thereof. The LCD panel (45) is brought into contact with conductive contact elements (13) and fixed by fixing means (71) to be electrically connected to a circuit board (81). An insulator (11) has a first surface (11*a*) for mounting the peripheral portion of the LCD panel (45), and a second surface (11*b*) to be faced to the circuit board (11*b*). The contact elements (13) are fixedly mounted in the insulator (11) to be brought into contact with the terminal electrodes (45*d*), respectively, when the LCD panel (45) is disposed on the first surface (11*a*) of the insulator (11). The fixing means (71) clamps and fixedly holds the insulator (11) and the LCD panel (45) when the LCD panel (45) is disposed on the first surface (11*a*). The insulator (11) is combined with a header (100) to be mounted on the circuit board (81).

21 Claims, 9 Drawing Sheets

LCD PANEL CONNECTOR FOR USE IN CONNECTION BETWEEN AN LCD PANEL AND A CIRCUIT BOARD

BACKGROUND OF THE INVENTION

This invention relates to an LCD panel connector for use in connection between a circuit board and an LCD (Liquid Crystal Display) panel such as a liquid crystal glass plate and a liquid crystal film and, in particular, to an LCD panel connector adapted for use in electrical connection between a terminal electrode of an LCD panel and a conductive portion of a circuit board.

In an LCD panel using a driving system such as a static driving system, a simple matrix driving system, and an active matrix driving system, a plurality of terminal electrodes formed on a glass substrate with a liquid crystal enclosed therein are connected to a conductive pattern of a circuit board through an FPC (flexible printed circuit), as known in the art.

The terminal electrodes and the FPC are bonded to each other by the use of an adhesive with an anisotropic conductive sheet interposed therebetween.

The above-mentioned conventional technique of connecting the LCD panel has several disadvantages which will presently be described.

In case of occurrence of a defect in the LCD panel, the LCD panel must be replaced by a new LCD panel. In this event, the FPC and the anisotropic conductive sheet must be exchanged together with the LCD panel because the terminal electrodes and the FPC are fixed to each other by bonding as mentioned above.

Since the LCD panel and the FPC are connected to each other with the anisotropic conductive sheet interposed therebetween, assembling operation and reworking upon exchange inevitably become complicated.

Because the terminal electrodes and the FPC are bonded by the use of the adhesive which takes a considerably long time to be solidified.

After completion of the assembling operation, it is impossible to visually confirm, from external appearance, occurrence of interruption of connection and bonding defects.

Since the terminal electrodes and the FPC are electrically connected through the anisotropic conductive sheet, the terminal electrodes must be sufficiently long at connecting portions. This results in susceptibility to the influence of external noise at the connecting portions.

SUMMARY OF THE INVENTION

It is an object of this invention to provide an LCD panel connector capable of improving facility of assembling operation and reliability of electrical connection.

It is another object of this invention to provide an LCD panel connector capable of connecting an LCD panel and a circuit board with a decreased distance left therebetween and suppressing the influence of external noise at connecting portions.

It is still another object of this invention to provide an LCD panel connector capable of readily exchanging a defective LCD panel.

According to this invention, there is provided an LCD panel connector for use in electrical connection between a circuit board and an LCD panel having a plurality of terminal electrodes at a peripheral portion thereof, which comprises an insulator having a first surface for mounting the peripheral portion of the LCD panel thereon and a second surface to be faced to circuit board; a plurality of conductive contact elements fixedly mounted in the insulator to be brought into contact with the terminal electrodes, respectively, when the LCD panel is disposed on the first surface; and fixing means for removably fixing the LCD panel to the insulator in the condition that the peripheral portion of the LCD panel is disposed on the first surface.

Preferably, the LCD panel connector may further comprise a header to be fitted into the insulator to be mounted on the circuit board, the header comprising a header insulator and a plurality of header contacts to be in contact with the contact elements.

DESCRIPTION OF THE PREFERRED EMBODIMENTS

Prior to description of embodiments of this invention, a conventional connection technique of an LCD panel to a circuit board will be described.

Figure 1:
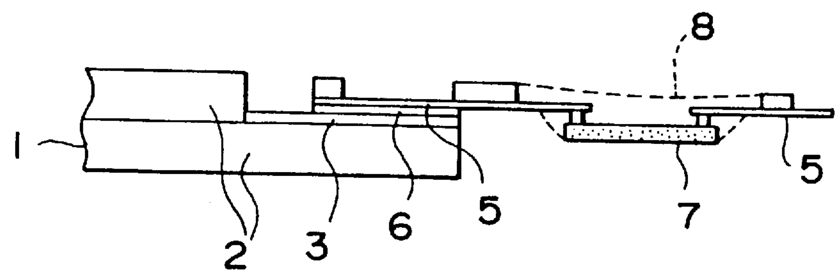
FIG. 1 is a schematic view for describing a conventional technique of connecting an LCD panel.
Figure 2:
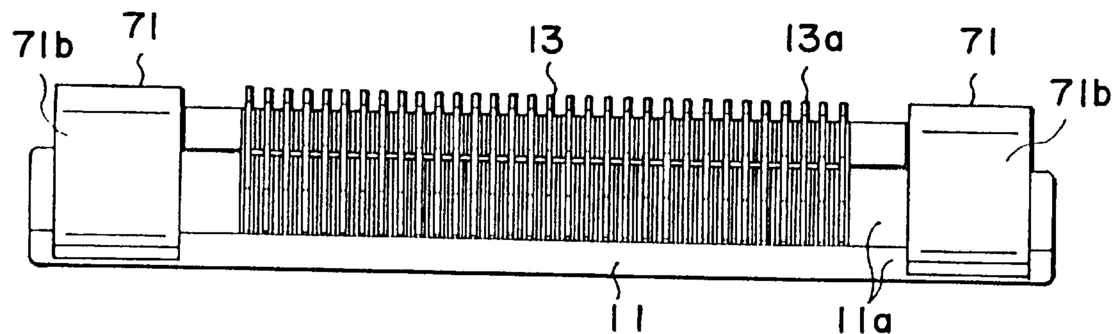
FIG. 2 is a plan view of an LCD panel connector according to an embodiment of this invention.

As illustrated in FIG. 1, the conventional LCD panel 1 comprises a pair of glass substrates 2 with a liquid crystal enclosed therein and a plurality of terminal electrodes 3 formed on the lower one of the glass substrates 2. The terminal electrodes 3 are connected to conductive portions of a circuit board (not shown) through an FPC 5.

The terminal electrodes 3 of the LCD panel 1 and the FPC 5 are bonded to each other by the use of an adhesive with an anisotropic conductive sheet 6 interposed therebetween.

Specifically, the FPC 5 is connected through the anisotropic conductive sheet 6 to the terminal electrodes 3 of an ITO (indium tin oxide) film formed on the lower glass substrate 2. On an intermediate portion of the FPC 5, a driving IC 7 is mounted and fixed by a potting agent 8 of rubber.

However, the conventional connection technique has the problems described in the preamble.

Referring to FIGS. 2 through 11, an LCD panel connector according to an embodiment of the present invention will be described.

At first referring to FIGS. 2 through 5, the LCD panel connector comprises an insulator 11 of a generally rectangular plate shape, a plurality of conductive contact elements 13 attached to the insulator 11, and clips 71 as fixing members for fixing an LCD panel 45 to the insulator 11.

Figure 4:
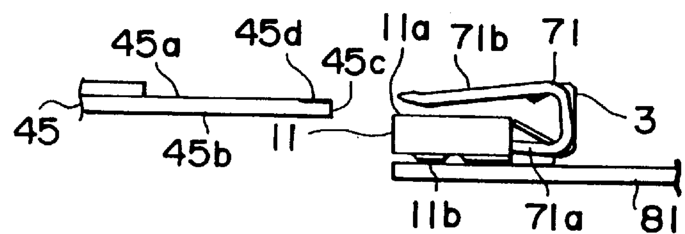
FIG. 4 is a right side view of the LCD panel connector illustrated in FIG. 3 together with an LCD panel and a circuit board.

As illustrated in FIG. 4, the LCD panel connector in this embodiment is for use in electrical connection between the LCD panel 45 having a plurality of terminal electrodes 45*d* formed at a peripheral portion thereof and a circuit board 81.

The LCD panel 45 comprises two glass substrates, i.e., upper and lower glass substrates with a liquid crystal material enclosed therebetween. The upper and the lower glass substrates have confronting surfaces each of which is coated with a conductive film. The conductive film on the upper glass substrate at the side of viewing the LCD panel 45 is provided with display segments. At the peripheral portion of the LCD panel 45, the upper glass substrate is removed. Thus, the terminal electrodes 45*d* are exposed at the peripheral portion. The conductive film on the lower glass substrate is connected to the terminal electrodes 45*d*.

The insulator 11 has a first surface 11*a* for mounting the peripheral portion of the LCD panel 45 thereon, and a second surface 11*b* to be faced to the circuit board 81.

The conductive contact elements 13 are fixedly mounted in the insulator 11 to be brought into one-to-one contact with the terminal electrodes 45*d* when the LCD panel 45 is disposed on the first surface 11*a*.

The conductive contact elements 13 are arranged in parallel at a predetermined interval from one another in a direction intersecting a longitudinal direction of the insulator 11.

The LCD panel 45 has a main surface 45*a* with the terminal electrodes 45*b* formed thereon, and an opposite surface 45*b* to face the first surface 11*a* of the insulator 11.

Figure 6:
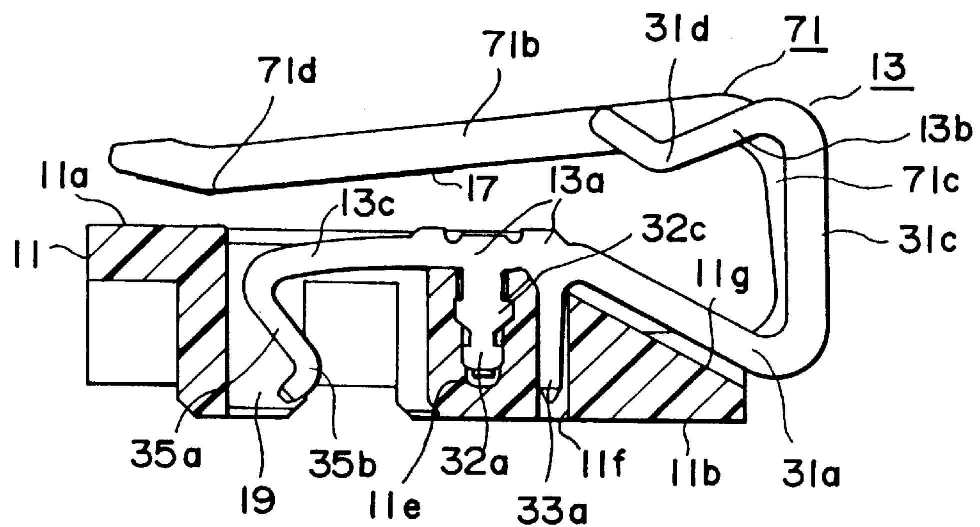
FIG. 6 is a sectional view taken along a line VI—VI in FIG. 3.

As illustrated in FIG. 6, each of the clips 71 comprises a generally U shape for clipping and holding the insulator 11 and the LCD panel 45 together. The clips 71 are attached at both longitudinal ends of the insulator 11. The clips 71 serve to elastically press the main surface 45*a* of the LCD panel 45 against the first surface 11*a* of the insulator 11 when the LCD panel 45 is disposed on the first surface 11*a*.

Figure 7:
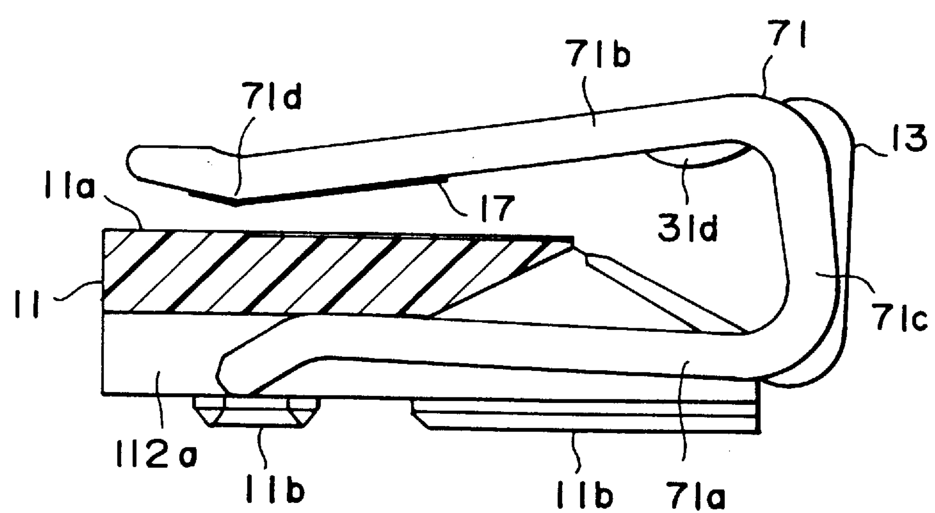
FIG. 7 is a sectional view taken along a line VII—VII in FIG. 3.

As illustrated in FIG. 7 also, each of the clips 71 has a first arm 71*a* to be engaged with the second surface 11*b* of the insulator 11, a second arm 71*b* faced to and extending along the first surface 11*a*, and a connecting portion 71*c* connecting the first and the second arms 71*c* to each other.

The second arm 71*b* extends from the connecting portion 71*c* to a free end to be slightly inclined downwards. The free end of the second arm 71*b* has a pressing portion 71*d* formed at a position closest to the first surface 11*a* to press the main surface 45*a* of the LCD panel 45 against the first surface 11*a*.

Figure 3:
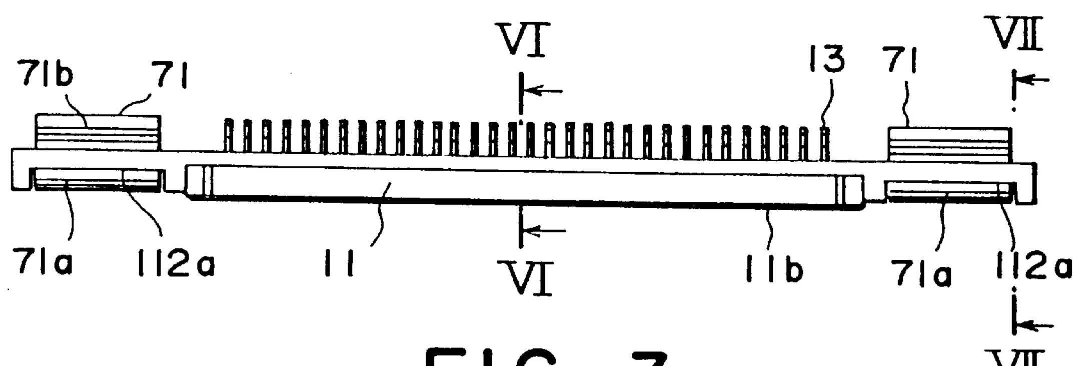
FIG. 3 is a front view of the LCD panel connector illustrated in FIG. 2.
Figure 5:
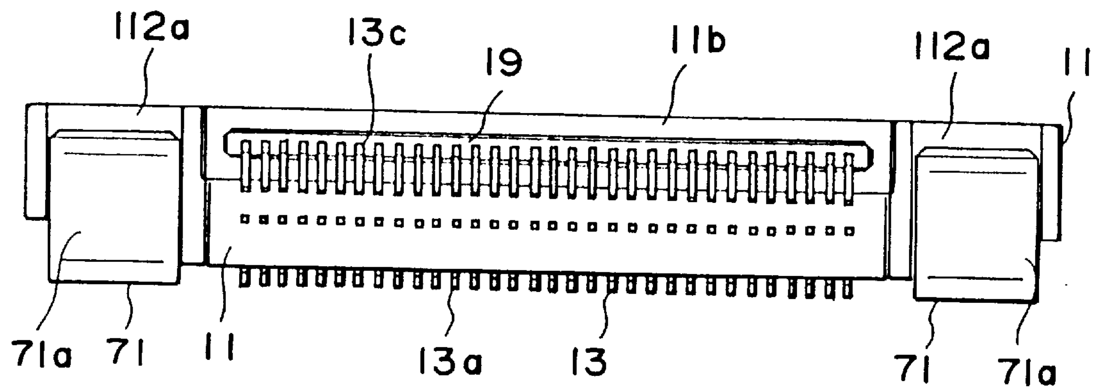
FIG. 5 is a bottom view of the LCD panel connector illustrated in FIG. 3.
Figure 8:
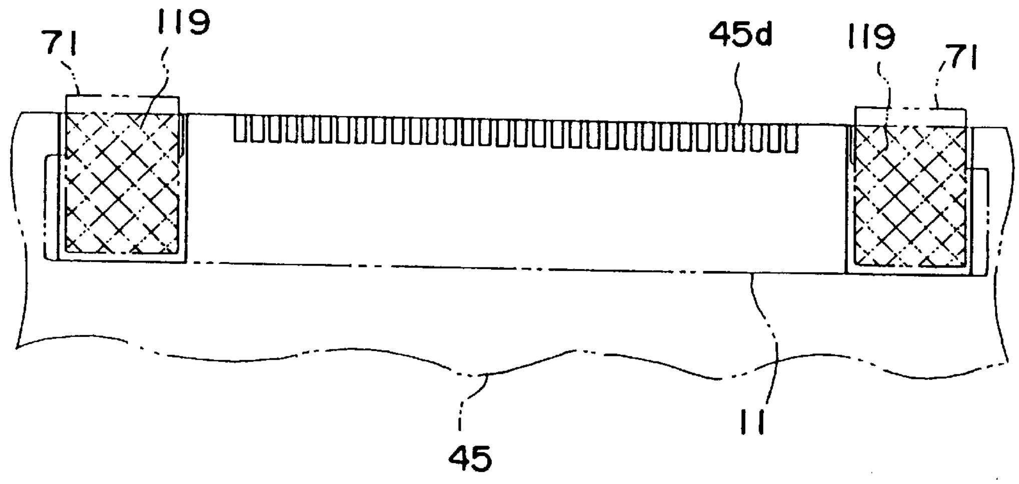
FIG. 8 is a plan view showing a positional relationship between the LCD panel connector and the LCD panel connected thereto.
Figure 9:
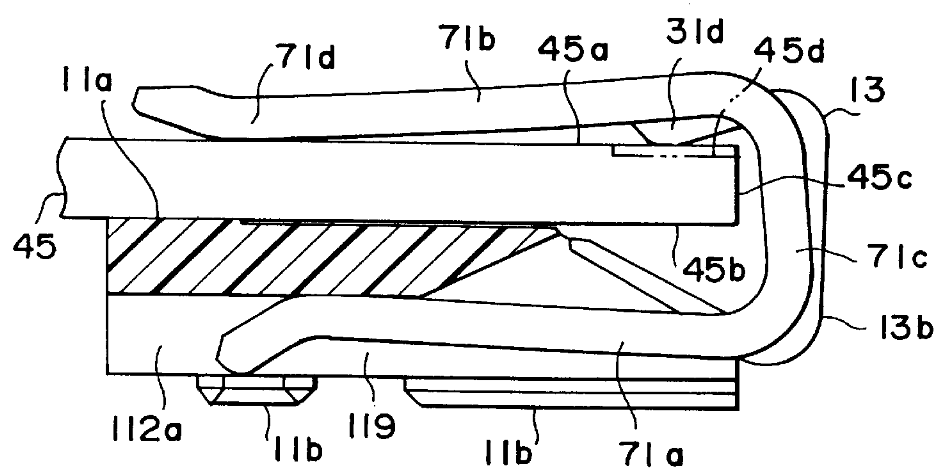
FIG. 9 is a sectional view of the LCD panel connector in FIG. 7 with the LCD panel fixed to a fixing member attached to the LCD panel connector.

As illustrated in FIG. 8, the insulator 11 has a pair of clip spaces 119 formed at the both longitudinal ends thereof along the peripheral portion of the LCD panel 45 to receive the clips 71, respectively. As illustrated in FIGS. 3, 5, and 9, the clip spaces 119 are provided with engaging recesses 112*a* formed at the side of the second surface 11*b* of the insulator 11 to engage he first arm 71*a*.

Each of the clips 71 in this embodiment comprises an elastic material such as an elastic metal. The second arm 71*b* is coated with an electric insulator 17 on a press contact surface for pressing the LCD panel 45 against the first surface 11*a*. Specifically, the terminal electrodes 45*d* of the LCD panel 45 may be brought into contact with the clips 71. In order to avoid short-circuiting of the terminal electrodes 45*d*, the second arm 71*b* must be coated with the electric insulator 17 around the pressing portion 71*d* to be brought into contact with the main surface 45*a* of the LCD panel 45. The electric insulator 17 may be, for example, polyimide resin. In case where no terminal electrodes 45*d* are present around a position to be brought into contact with the second arm 71*b*, the second arm 71*b* need not be coated with the electric insulator 17. In case where the clip 71 comprises a resin material, the second arm 71*b* need not be coated with the electric insulator 17.

The contact elements 13 are formed by punching a conductive plate. The contact elements 13 clamp the peripheral portion of the LCD panel 45 to be brought into elastic contact with the terminal electrodes 45*d* when the LCD panel 45 is disposed on the first surface 11*a*.

Figure 10:
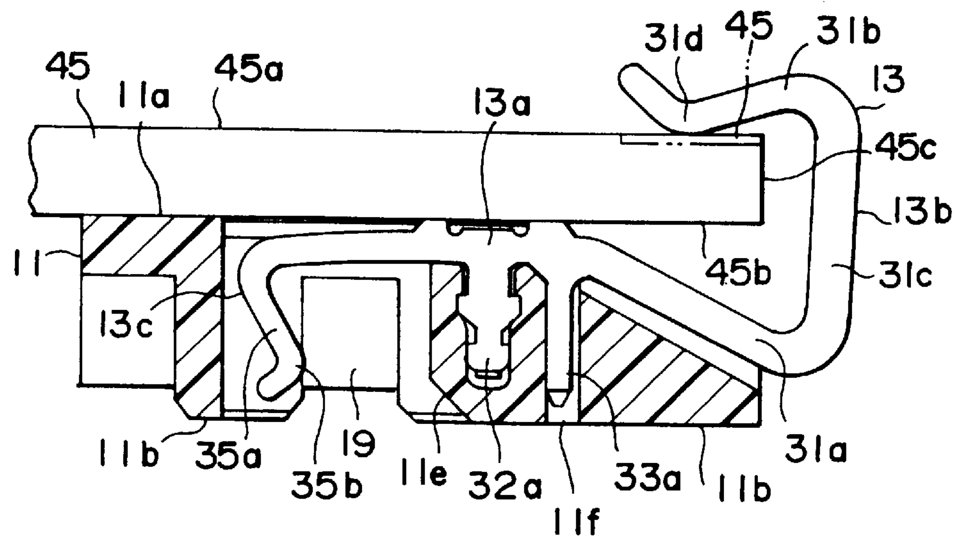
FIG. 10 is a sectional view of the LCD panel connector in FIG. 6 with the LCD panel connected to contact elements of the LCD panel connector.
Figure 11:
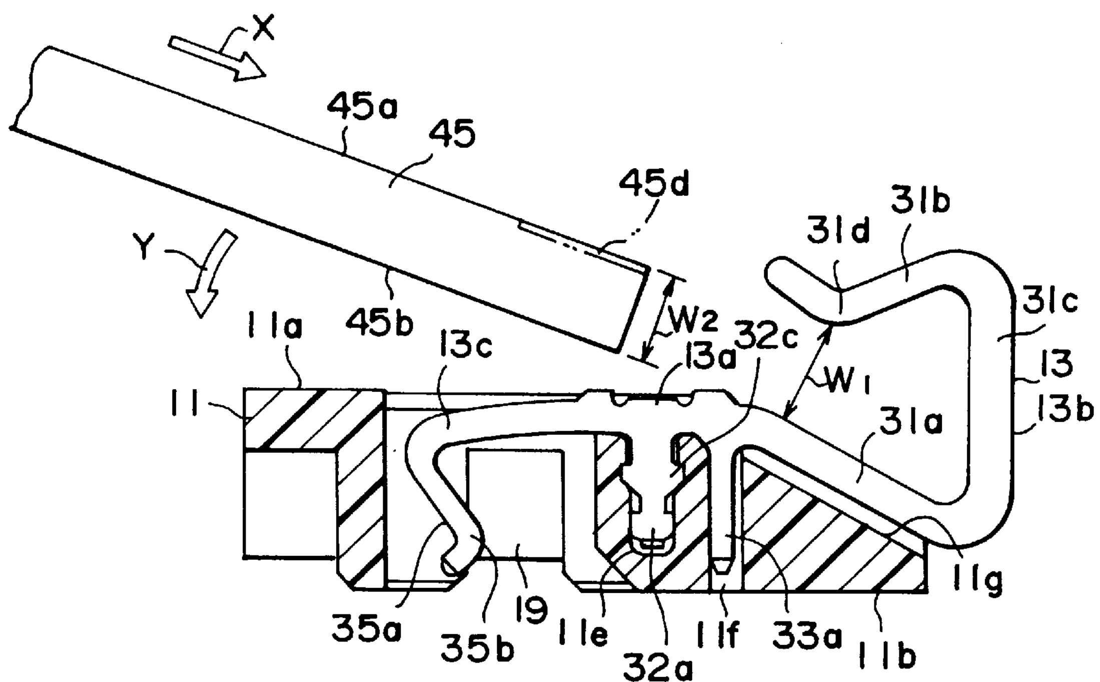
FIG. 11 is a sectional view of the LCD panel connector in FIG. 10 before the LCD panel is connected to the contact elements of the LCD panel connector.
Figure 12:
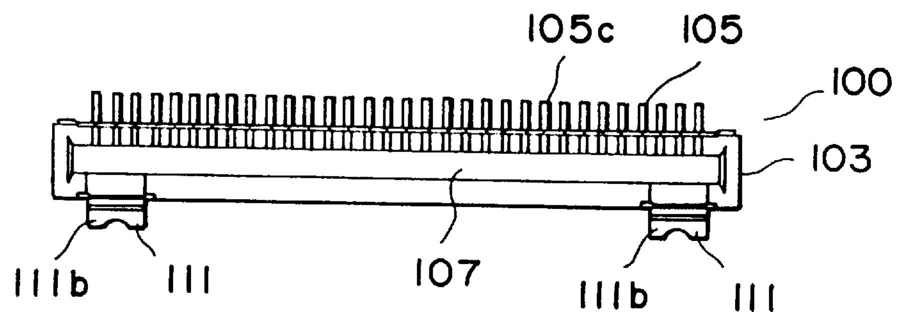
FIG. 12 is a plan view of a header to be used together with the LCD panel connector.
Figure 13:
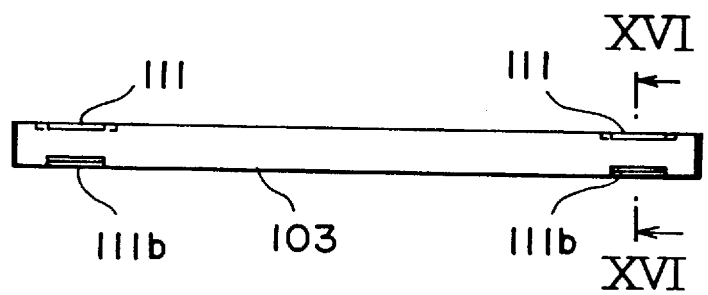
FIG. 13 is a front view of the header illustrated in FIG. 12.
Figure 14:
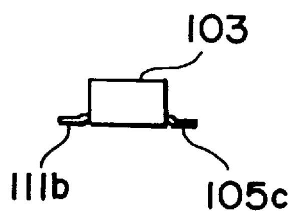
FIG. 14 is a right side view of the header illustrated in FIG. 12.
Figure 15:
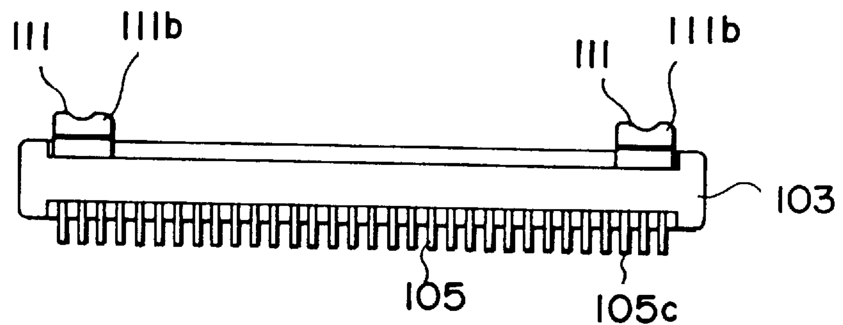
FIG. 15 is a bottom view of the header illustrated in FIG. 13.
Figure 16:
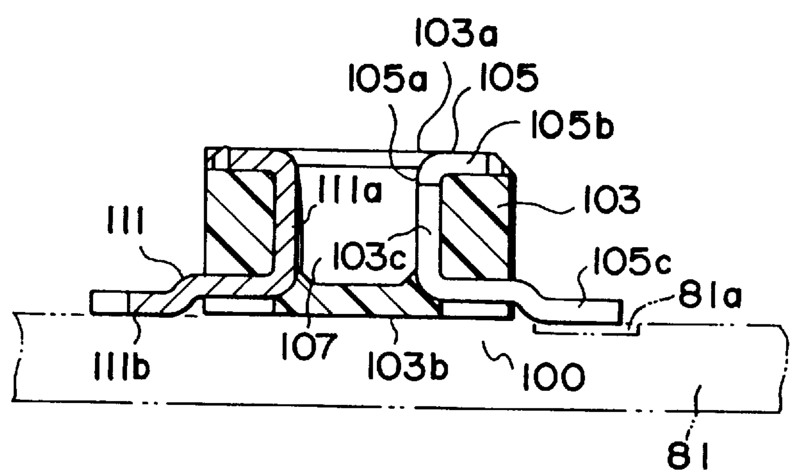
FIG. 16 is a sectional view taken along a line XVI—XVI in FIG. 13.

As illustrated in FIGS. 6, 10 and 11 in detail, each of the contact elements 13 has a holding portion 13*a* held by the insulator 11, and a contact spring portion 13*b* extending from one end of the holding portion 13*a* to be bent so as to surround the main surface 45*a*, the opposite surface 45*b*, and a side surface 45*c* at the peripheral portion of the LCD panel 45. Each of the contact elements 13 further has a terminal portion 13*c* extending from the other end of the holding portion 13*a* to be bent towards the second surface 11*b*.

The contact spring portion 13*b* has a first spring portion 31*a* to face the opposite surface 45*b*, a second spring portion 31*b* to face the terminal electrodes 45*d*, and a connecting spring portion 31*c* connecting the first and the second spring portions 31*a* and 31*b* to each other and to face the side surface 45*c* when the LCD panel 45 is disposed on the first surface 11*a*.

The second spring portion 31*b* has a main surface contacting portion 31*d* to be brought into elastic contact with the terminal electrodes 45*d*. The first spring portion 31*a* and the main surface contacting portion 31*d* are arranged opposite to each other. Between the holding portion 13*a* and the connecting spring portion 31*c*, the first spring portion 31*a* is inclined from the first surface 11*a* towards the second surface 11*b*. The insulator 11 has an inclined surface 11*g* faced to the first spring portion 31*a* and inclined from the first surface ha towards the second surface 11*b*.

A minimum distance (W1 in FIG. 11) between the main surface contacting portion 31*d* and the first spring portion 31*a* is greater than a thickness (W2 in FIG. 11) of the peripheral portion of the LCD panel 45.

The insulator 11 has a terminal receiving hole 19 formed between the first and the second surfaces 11*a* and 11*b* to receive the terminal portions 13*c*. The terminal portions 13*c* are adapted to be brought into one-to-one contact with mating contact elements (not shown) formed on the circuit board 81 illustrated in FIG. 4.

The terminal portions 13*c* can be extended to reach conductive portions (not shown) formed on the circuit board 81 to be directly connected to the conductive portions in an appropriate manner such as soldering.

The insulator 11 and the holding portion 13*a* have engaging members 11*e* and 32*a* to be engaged with each other, respectively. Each of the engaging members 11*e* is implemented by an engaging hole formed in the insulator 11 to extend from the first surface 11*a* towards the second surface 11*b*. Each of the engaging members 32*a* comprises an engaging piece extending from the holding portion 13*a* to be engaged with the engaging hole 11*e*.

The engaging piece 32*a* is engaged with the engaging hole 11*e* by press-fitting. Specifically, the engaging piece 32*a* has a plurality of protrusions 32*c* formed at an intermediate portion and having a width slightly greater than that of the engaging hole 11*e*. The protrusions 32*c* slightly penetrate an inner wall of the engaging hole 11*e* when the engaging piece 32*a* is press-fitted into the engaging hole 11*e*.

The engaging piece 32*a* may be engaged by a mold-in technique simultaneously when the insulator 11 is molded.

The insulator 11 and the holding portions 13*a* have positioning members 11*f* and 33*a* in parallel to the engaging holes 11*e* and the engaging pieces 32*a*, respectively, in order to position the contact elements 13 and to maintain their attitude.

Each of the positioning members 33*a* comprises a projection extending from the holding portion 13*a* towards the second surface 11*b*. Each of the positioning members 11*f* is implemented by a projection receiving hole extending from the first surface 11*a* of the insulator 11 to the second surface 11*b* to insert the projection 33*a*. The projection 33*a* extends in parallel to the engaging piece 32*a* at a space kept from the engaging piece 32*a*.

In order to fixedly mount the contact elements 13 in the insulator 11, top ends of the engaging pieces 32*a* are positioned at opening portions of the engaging holes 11*e* at the side of the first surface 11*a*. Simultaneously, top ends of the projections 33*a* are positioned at opening portions of the projection receiving holes 11*f* at the side of the first surface 11*a*. In this event, top ends of the terminal portions 13*c* are positioned at an opening portion of the terminal receiving hole 19 at the side of the first surface 11*a*.

Thereafter, each of the projections 33*a* is inserted into the projection receiving hole 11*f* while the contact element 13 is positioned with its attitude maintained. At this time, the contact element 13 is pressed by a jig from the side of the first surface 11*a* towards the second surface 11*b* so that the engaging piece 32*a* is press-fitted into the engaging hole 11*e* to be engaged therewith. When the engaging piece 32*a* is press-fitted into the engaging hole 11*e*, the protrusions 32*c* slightly penetrate the inner wall of the engaging hole 11*e*. Then, the contact elements 13 are held in the insulator 11.

When the contact elements 13 are held in the insulator 11, the terminal portions 13*c* are located at predetermined positions in the terminal receiving hole 19 and the contact spring portions 13*c* are faced to the inclined surface 11*g* of the insulator 11.

The operation of fixedly mounting the contact elements 13 in the insulator 11 can be carried out by the use of an automatic apparatus.

Next, description will be made about the operation of connecting and fixing the LCD panel 45 to the LCD panel connector.

As illustrated in FIG. 11, the LCD panel 45 is inclined with respect to the first surface 11*a* and inserted (in a direction depicted at X in FIG. 11) between the first and second spring portions 31*a* and 31*b* of the contact spring portions 13*b* with the side surface 45*c* directed forward. At this time, the insertion of the LCD panel 45 can be performed with zero insertion force because the minimum distance W1 between the main surface contacting portion 31*d* and the first spring portion 31*a* is greater than the thickness W2 of the peripheral portion of the LCD panel 45.

Thus, the terminal electrodes 45*d* of the LCD panel 45 can be inserted without sliding contact with the main surface contacting portions 31*d*. It is therefore possible to avoid mechanical damage such as abrasion of the terminal electrodes 45*d* comprising the thin film. This assures reliable electrical connection.

When the LCD panel 45 is moved by the insertion operation to a position where the terminal electrodes 45*d* face the main surface contacting portions 31*d*, the LCD panel 45 is then rotated to be disposed on the first surface 11*a* so that the terminal electrodes 45*d* are brought into contact with the main surface contacting portions 31*d*. In this state, the contact spring portions 13*b* clamp the peripheral portion of the LCD panel 45 and are brought into contact with the terminal electrodes 45 with appropriate contacting force because the contact spring portions 13*b* has elasticity.

As illustrated in FIG. 9, the first arms 71*a* of the clips 71 are fitted into the engaging recesses 112*a* of the clip spaces 119 at the both longitudinal ends of the insulator 11. At this time, the pressing portions 71*d* at the free ends of the second arms 71*b* presses the LCD panel 45 towards the first surface 11*a* so as to reliably hold the LCD panel 45 between the insulator 11 and the second arms 71*b*.

After the clips 71 are attached to the insulator 11, the terminal electrodes 45*d* of the LCD panel 45 are brought into contact with the main surface contacting portions] 31*d* of the contact elements 13. Furthermore, the terminal portion 13*c* of the contact element 13 has an elastic terminal spring portion 35*a* which has a substrate contacting portion 35*b*. The substrate contacting portion 35*b* is connected to the conductor pattern on the circuit board. Thus, it is possible to electrically connect the LCD panel 45 and the circuit board 81. Preferably, the substrate contacting portion 35*b* is brought into contact with a mating contact element of a mating connector or a header which is mounted on and electrically connected to the circuit board 81.

Referring to FIGS. 12 through 16, the header 100 shown therein has a header insulator 103 mounted on the circuit board 81 to be coupled to the terminal receiving hole 19, and a plurality of conductive header contact elements 105 mounted in a header insulator 103 to be brought into one-to-one contact with the terminal portions 13*c* of contact elements 13 of the LCD panel connector shown in FIGS. 2–11.

The header insulator 103 has a first header surface 103*a* parallel to the first surface 11*a* of the insulator 11, a second header surface 103*b* faced to the circuit board 81, and a groove 107 extending from the first header surface 103*a* towards the second header surface 103*b*.

The header contact elements 105 have header contact portions 105*a* extending along one vertical wall surface 103*c* of the groove 107, and header terminal portions 105*c* to be brought into one-to-one contact with conductive portions 81*a* formed on the circuit board 81.

The header 100 further has two hold-downs 111 for fixing the header insulator 103 to the circuit board 81. Each of the hold-downs 111 comprises a supporting portion 111*a* extending along the other vertical wall surface of the groove 107, and a fixing portion 111*b* extending from one end of the supporting portion 111*a* towards the exterior of the header insulator 103 to be fixed to the circuit board 81.

Figure 17:
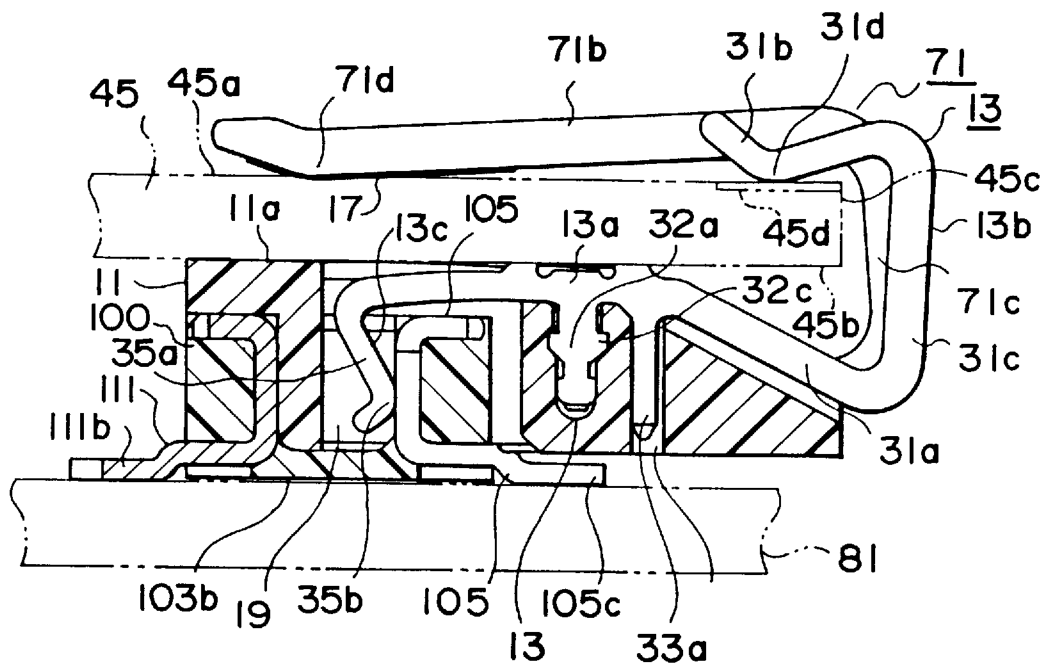
FIG. 17 is a sectional view of a combined condition of the LCD panel connector of FIG. 6 and the header illustrated in FIG. 16.

As illustrated in FIG. 17, the header 100 is coupled to the terminal receiving hole 19 formed between the first and the second surfaces 11*a* and 11*b* of the insulator 11 to receive the terminal portions 13*c*.

Figure 18:
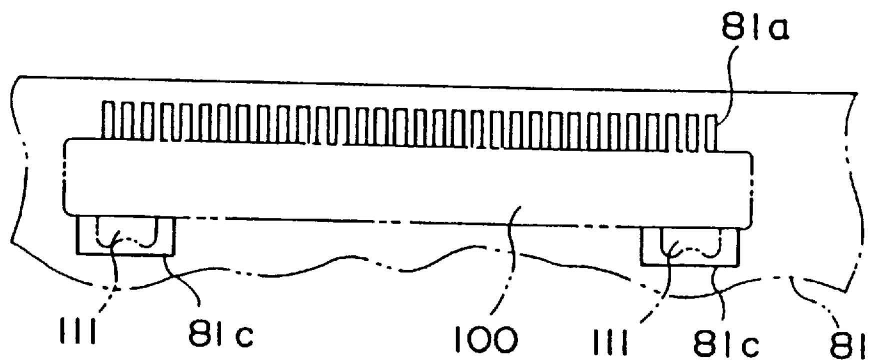
FIG. 18 is a plan view for describing a positional relationship between the header in FIG. 12 and a circuit board.

In the LCD panel connector having the above-mentioned structure, the hold-downs 111 are fixed to hold-down fixing portions 81*c* on the circuit board 81 in FIG. 18. In addition, the header terminal portions 105*c* are connected to the conductive portions 81*a* on the circuit board 81 so that the header 100 is fixed on the circuit board 81.

Thereafter, the insulator 11 with the contact elements 13 fixedly mounted therein is combined with the header 100. Specifically, the insulator 11 is put on the header insulator 103 of the header 100 from a position above the header insulator 103 so that the header insulator 103 is received in the terminal receiving hole 19 of the insulator 11.

The order of operation of combining the header 100, the insulator 11, and the circuit board 81 is not restricted to that mentioned above. Alternatively, it is possible to preliminarily combine the header 100 and the insulator 11 before the header 100 is fixed onto the circuit board 81.

After the header 100 and the insulator 11 are combined, the LCD panel 45 is connected to the contact elements 13 in the insulator 11 and clipped between the insulator 11 and the second arms 71*b* to be reliably held.

After the clips 71 are attached to the insulator 11, the LCD panel 45 and the circuit board 81 is electrically connected.

Alternatively, the LCD panel 45 may be preliminarily mounted and connected to the insulator 11 before the header 100 is combined with the insulator 11.

The shapes of the terminal portions 13*c* of the contact elements 3 and the insulator 11 can be appropriately selected in correspondence to the shape of the LCD panel 45.

In the LCD panel connector according to this invention, the LCD panel 45 is mounted on the insulator 11 with the contact elements 13 and the terminal electrodes 45*d* of the LCD panel 45 brought into contact with each other. In addition, the insulator 11 and the LCD panel 45 are reliably held by the clips 71. Therefore, reliability of contact and facility of assembling operation are improved.

The LCD panel 45, when becomes defective, can be easily removed and exchanged by releasing the clips 71. Thus, reworking is easy.

Since the terminal electrodes 45*d* can be short, material saving is achieved. Particularly, when the LCD panel 45 comprises a glass substrate, such material saving is remarkable. Specifically, in the conventional technique using the FPC, the terminal electrodes 45*d* must have a length at least equal to 2 mm because the FPC is adhered to the terminal electrodes 45*d* on the glass substrate. On the other hand, in the structure of this invention, stable electric connection is assured even if the terminal electrodes 45*d* have a length of 1 mm or less.

Since the LCD panel 45 and the circuit board 81 can be connected in a shortest distance, the influence of the external noise is suppressed.

What is claimed is:

1. An LCD panel connector for use in electrical connection between a circuit board (81) and an LCD panel (45) having a plurality of terminal electrodes (45*d*) at a peripheral portion thereof, which comprises:

an insulator (11) having a first surface (11*a*) for mounting said peripheral portion of said LCD panel (45) thereon and a second surface (11*b*) to be faced to said circuit board;

a plurality of conductive contact elements (13) fixedly mounted in said insulator (11) to be brought into contact with said terminal electrodes (45*d*), respectively, when said LCD panel (45) is disposed on said first surface (11*a*); and fixing means (71) for removably fixing said LCD panel (45) to said insulator (11) in the condition that said peripheral portion of said LCD panel (45) is disposed on said first surface (11*a*).

2. An LCD panel connector as claimed in claim 1, said LCD panel (45) having a main surface (45*a*) with said terminal electrodes (45*d*) formed thereon and an opposite surface (45*b*) to be faced to said first surface (11*a*) of said insulator (11), wherein:

said fixing means (71) comprises a plurality of clips each having a generally "U" shape for clipping and holding said LCD panel (45) and said insulator (11) together with each other to elastically press said LCD panel (45) onto said first surface (11*a*) of said insulator (11), each of said clips comprising a first arm (71*a*) for engaging said second surface (11*b*) of said insulator (11), a second arm (71*b*) extending along said first surface (11*a*) with a gap left therebetween to elastically engage said main surface (45*a*) of said LCD panel (45) when said LCD panel (45) is disposed on said first surface (11*a*) of said insulator (11), and a connecting portion (71*c*) connecting said first and said second arms (71*a*, 71*b*) to each other.

3. An LCD panel connector as claimed in claim 2, wherein said insulator (11) having clip spaces (119) is formed at both longitudinal ends to receive said clips (71), respectively, said clip spaces (119) having, at said second surface (11*b*), engaging recesses (112*a*) for engaging said first arms (71*a*), respectively.

4. An LCD panel connector as claimed in claim 2, said clips (71) comprising an elastic material, wherein:

said second arm (71*b*) is coated with an electric insulator (17) on a press contact surface for pressing said LCD panel (45) against said first surface (11*a*).

5. An LCD panel connector as claimed in claim 1, said LCD panel (45) having a main surface (45*a*) with said terminal electrodes (45*d*) formed thereon and an opposite surface (45*a*) to be faced to said first surface (11*a*) of said insulator (11), wherein:

said contact elements (13) clamps said peripheral portion of said LCD panel (45) in elastic contact with said terminal electrodes (45*d*) when said LCD panel (45) is disposed on said first surface (11*a*).

6. An LCD panel connector as claimed in claim 5, said fixing means (71) comprising a plurality of clips each having a generally "U" shape for clipping and holding said LCD panel (45) and said insulator (11) together with each other to elastically press said LCD panel (45) onto said first surface (11*a*) of said insulator (11), each of said clips comprising a first arm (71*a*) for engaging said second surface (11*b*) of said insulator (11), a second arm (71*b*) extending along said first surface (11*a*) to elastically engage said main surface (45*a*) of said LCD panel (45) when said LCD panel (45) is disposed on said first surface (11*a*) of said insulator (11), and a connecting portion (71*c*) connecting said first and said second arms (71*a*, 71*b*) to each other.

7. An LCD panel connector as claimed in claim 5, each of said contact elements (13) having a holding portion (13*a*)

held by said insulator (11), a contact spring portion (13*b*) extending from one end of said holding portion (13*a*) to be bent so as to surround said main surface (45*a*), said opposite surface (45*b*), and a side surface (45*c*) at said peripheral portion, and a terminal portion (13*c*) extending from the other end of said holding portion (13*a*) to be bent towards said second surface (11*b*).

8. An LCD panel connector as claimed in claim 7, said contact spring portion (13*b*) having a first spring portion (31*a*) to face said opposite surface (45*b*) when said LCD panel (45) is disposed on said first surface (11*a*), a second spring portion (31*b*) to face said terminal electrodes (45*d*), and a connecting spring portion (31*c*) connecting said first hand said second spring portions (31*a*, 31*b*) to each other and to face said side surface (45*c*).

9. An LCD panel connector as claimed in claim 8, wherein said second spring portion (31*b*) has a main surface contacting portion (31*d*) to be brought into elastic contact with said terminal electrodes (45*d*), said first spring portion (31*a*) and said main surface contacting portion (31*d*) being arranged opposite to each other.

10. An LCD panel connector as claimed in claim 8, said first spring portion (31*a*) being inclined between said holding portion (13*a*) and said connecting spring portion (31*c*) from said first surface (11*a*) towards said second surface (11*b*), a minimum distance between said main surface contacting portion (31*d*) and said first spring portion (31*a*) being greater than a thickness of said peripheral portion of said LCD panel (45).

11. An LCD panel connector as claimed in claim 7, said insulator (11) having a terminal receiving hole (19) formed between said first and said second surfaces (11*a*, 11*b*) to receive said terminal portions (13*c*).

12. An LCD panel connector as claimed in claim 7, said terminal portion (13*c*) having an elastic terminal spring portion (35*a*), said terminal spring portion (35*a*) having a substrate contacting portion (35*b*) to be brought into contact with said circuit board (81).

13. An LCD panel connector as claimed in claim 7, said insulator (11) and said holding portion (13*a*) having engaging means (11*e*, 32*a*) to be engaged with each other.

14. An LCD panel connector as claimed in claim 13, said engaging means (11*e*, 32*a*) including an engaging hole (11*e*) formed in said insulator (11) to extend from said first surface (11*a*) towards said second surface (11*b*), and an engaging piece (32*a*) extending from said holding portion (13*a*) to be engaged with said engaging hole (11*e*).

15. An LCD panel connector as claimed in claim 14, said engaging piece (32*a*) being engaged with said engaging hole (11*e*) by press-fitting.

16. An LCD panel connector as claimed in claim 14, said engaging piece (32*a*) being engaged by a mold-in technique simultaneously when said insulator (11) is molded.

17. An LCD panel connector as claimed in claim 14, said insulator (11) and said holding portion (13*a*) having positioning means (11*f*, 33*a*) in parallel to said engaging means (11*e*, 32*a*) in order to position said contact elements (13) and to maintain their attitude.

18. An LCD panel connector as claimed in claim 17, said positioning means (11*f*, 33*a*) including a projection (33*a*) extending from said holding portion (13*a*) towards said second surface (11*b*), and a projection receiving hole (11*f*) extending from said first surface (11*a*) of said insulator (11) to said second surface (11*b*) to insert said projection (33*a*).

19. An LCD panel connector as claimed in claim 1, which further comprises a header (100) to be fitted into said insulator (11) to be mounted on said circuit board (81), said header comprising a header insulator and a plurality of header contacts to be in contact with said contact elements.

20. An LCD panel connector as claimed in claim 11, which further comprises a header (100) to be fitted into said insulator (11) to be mounted on said circuit board (81), said header (100) having a header insulator (103) mounted on said circuit board (81) to be fitted into said terminal receiving hole (19), and a plurality of conductive header contact elements (105) mounted in said header insulator (103) to be brought into contact with said terminal portions (13*c*), respectively, wherein:

said header insulator (103) has a first header surface (103*a*) parallel to said first surface (11*a*), a second header surface (103*b*) faced to said circuit board (81), and a groove (107) extending from said first header surface (103*a*) towards said second header surface (103*b*);

each of said header contact elements (105) having a header contact portion (105*a*) extending along one vertical wall surface (103*c*) of said groove (107), and a header terminal portion (105*c*) to be brought into contact with conductive portions (81*a*) formed on said circuit board (81), respectively.

21. An LCD panel connector as claimed in claim 20, said header (100) having hold-downs (111) for fixing said header insulator (103) to said circuit board (81), each of said hold-downs (111) having a supporting portion (111*a*) extending along the other vertical wall surface of said groove (107), and a fixing portion (111*b*) extending from one end of said supporting portion (111*a*) towards the exterior of said header insulator (103) to be fixed to said circuit board (81).

* * * * *

UNITED STATES PATENT AND TRADEMARK OFFICE
CERTIFICATE OF CORRECTION

PATENT NO. : 5,888,076
DATED : March 30, 1999
INVENTOR(S) : Itoh, et al.

It is certified that error appears in the above-identified patent and that said Letters Patent is hereby corrected as shown below:

Column 1 Line 38 delete "Because"

Column 1 Line 38 delete first occurance "the" and insert --The--

Column 4 Line 59 delete "ha" and insert --11a--

Column 6 Line 37 delete "]"

Column 7 Line 47 delete "becomes"

Column 7 Line 61 delete "shortest" and insert --short--

Column 9 Line 14 delete "hand" and insert --and--

Signed and Sealed this

Fourteenth Day of December, 1999

Attest:

Q. TODD DICKINSON

Attesting Officer

*Acting Commissioner of Patents and Trademarks*